US008000743B2

United States Patent
Tang

(10) Patent No.: US 8,000,743 B2
(45) Date of Patent: Aug. 16, 2011

(54) ELECTRONIC DEVICE WITH SIM CARD RETENTION ASSEMBLY

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 326 days.

(21) Appl. No.: 12/391,417

(22) Filed: Feb. 24, 2009

(65) Prior Publication Data

US 2010/0151906 A1 Jun. 17, 2010

(30) Foreign Application Priority Data

Dec. 12, 2008 (CN) .......................... 2008 1 0306196

(51) Int. Cl.
*H04M 1/00* (2006.01)
(52) U.S. Cl. .......................... 455/558; 439/296; 361/600
(58) Field of Classification Search ........................ None
See application file for complete search history.

(56) References Cited

U.S. PATENT DOCUMENTS

| | | | | |
|---|---|---|---|---|
| 6,062,889 A * | 5/2000 | Hyland et al. | ................ | 439/326 |
| 2005/0135052 A1* | 6/2005 | Kumagai | ...................... | 361/683 |
| 2005/0148366 A1* | 7/2005 | Okada | .......................... | 455/558 |
| 2006/0283947 A1* | 12/2006 | Yang et al. | ..................... | 235/441 |
| 2009/0035977 A1* | 2/2009 | Chen et al. | ..................... | 439/326 |

* cited by examiner

*Primary Examiner* — Rafael Pérez-Gutiérrez
*Assistant Examiner* — German Viana Di Prisco
(74) *Attorney, Agent, or Firm* — Clifford O. Chi

(57) ABSTRACT

An electronic device includes a first main body defining a SIM card seat, a SIM card disposed in the SIM card seat, and a SIM card retention assembly comprising a retaining member fixed to the first main body adjacent to the SIM card seat, a positioning member fixed to the retaining member, and a rotary member rotatably connected to the first main body between the retaining member and the SIM card seat. The rotary member can be rotated relative to the first main body in a substantially horizontal plane. The positioning member is configured for positioning the rotary member to make the rotary member fix the SIM card in the SIM card seat tightly.

14 Claims, 5 Drawing Sheets

ELECTRONIC DEVICE WITH SIM CARD RETENTION ASSEMBLY

BACKGROUND

1. Field of the Disclosure

The present disclosure relates to an electronic device and, particularly, to an electronic device with a subscriber identification module (SIM) card retention assembly.

2. Description of the Related Art

Nowadays, mobile phones are widely used and have become a part of modern life. Most mobile phones have a SIM card for carrying information which is necessary to operate the mobile phone. The SIM card may also contain personal information for the subscriber, for example, a listing of frequently used telephone numbers. Good electrical contact between the SIM card and the mobile phone is important. Therefore, a SIM card retention assembly is necessary for securing the SIM card in electronic devices such as mobile phones.

Typically, at least one SIM card seat is defined in a main body of the electronic device. A SIM card retention assembly includes a cover disposed above the SIM card seat. The cover and the SIM card seat cooperatively define a space for receiving the SIM card. When the SIM card is inserted into the space between the SIM card seat and the cover, a part of the SIM card is fixed tightly between the SIM card seat and the cover, and another part of the SIM card is exposed for disassembling.

Due the reduced size of the electronic devices and the SIM cards, disassembly of the SIM cards can be problematic. A user may be forced to draw the SIM card out of the SIM card retention assembly with a relatively large force, which increases the risk that the SIM card and the SIM card retention assembly will be damaged.

Therefore, a new electronic device with a SIM card retention assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
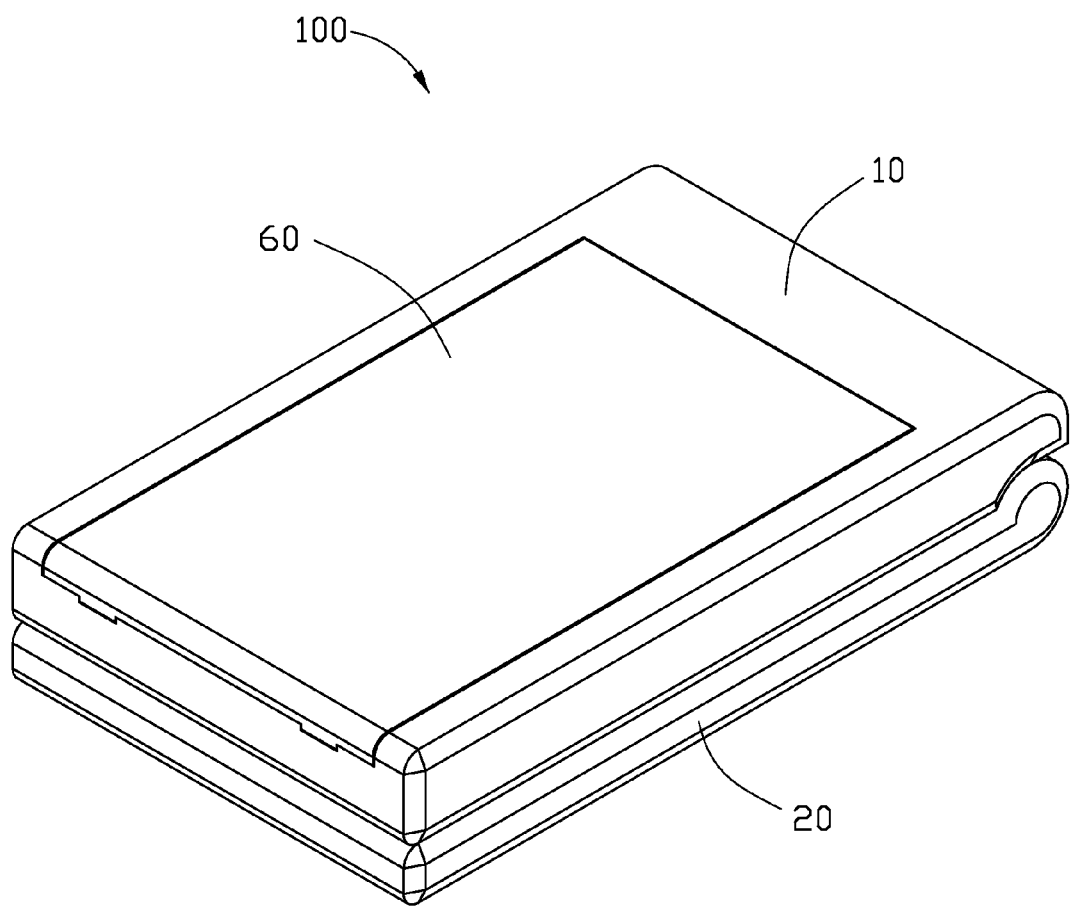
FIG. 1 is an assembled, isometric view of an embodiment of an electronic device, the electronic device including a SIM card retention assembly, a battery, and a cover.
Figure 2:
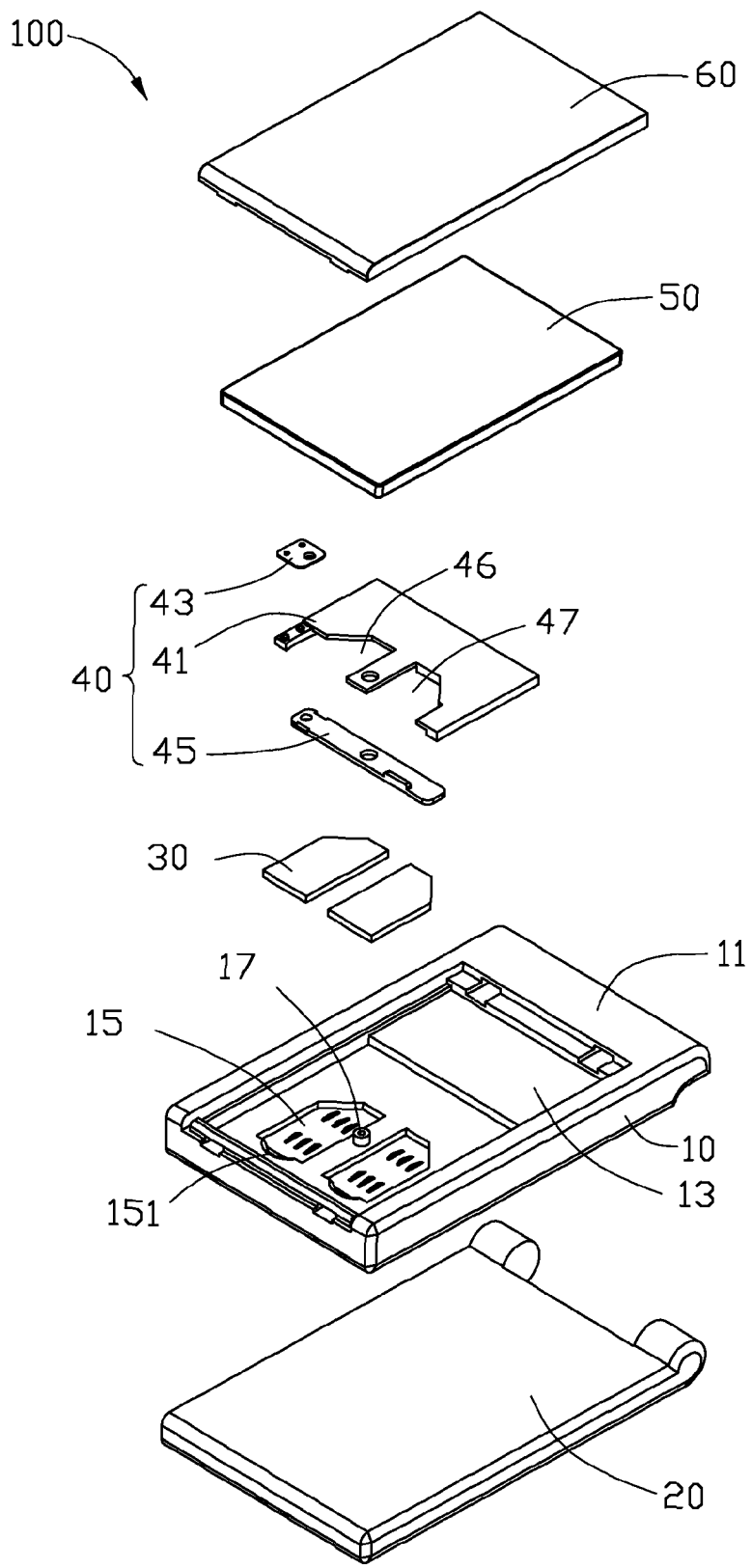
FIG. 2 is an exploded, isometric view of the electronic device of FIG. 1.

Referring to FIGS. 1 and 2, an embodiment of an electronic device 100 includes a first main body 10, a second main body 20 pivotally connected to the first main body 10, two subscriber identification module (SIM) cards 30, a SIM card retention assembly 40, a battery 50, and a cover 60. The first main body 10 defines a battery groove 13 for receiving the battery 50. A pair of SIM card seats 15 is aligned apart in a bottom surface of the battery groove 13. The two SIM cards 30 are correspondingly secured in the two SIM card seats 15 via the retention assembly 40. Each SIM card seat 15 defines an arcuate depression 151 at an end of each SIM card seat 15 to aid in assembling or disassembling the SIM cards 30 from the SIM card seats 15. A protruding column 17 protrudes from a portion of the bottom surface of the battery groove 13 between the two SIM card seats 15. The cover 60 is configured to cover the battery 50 in the first main body 10.

Figure 3:
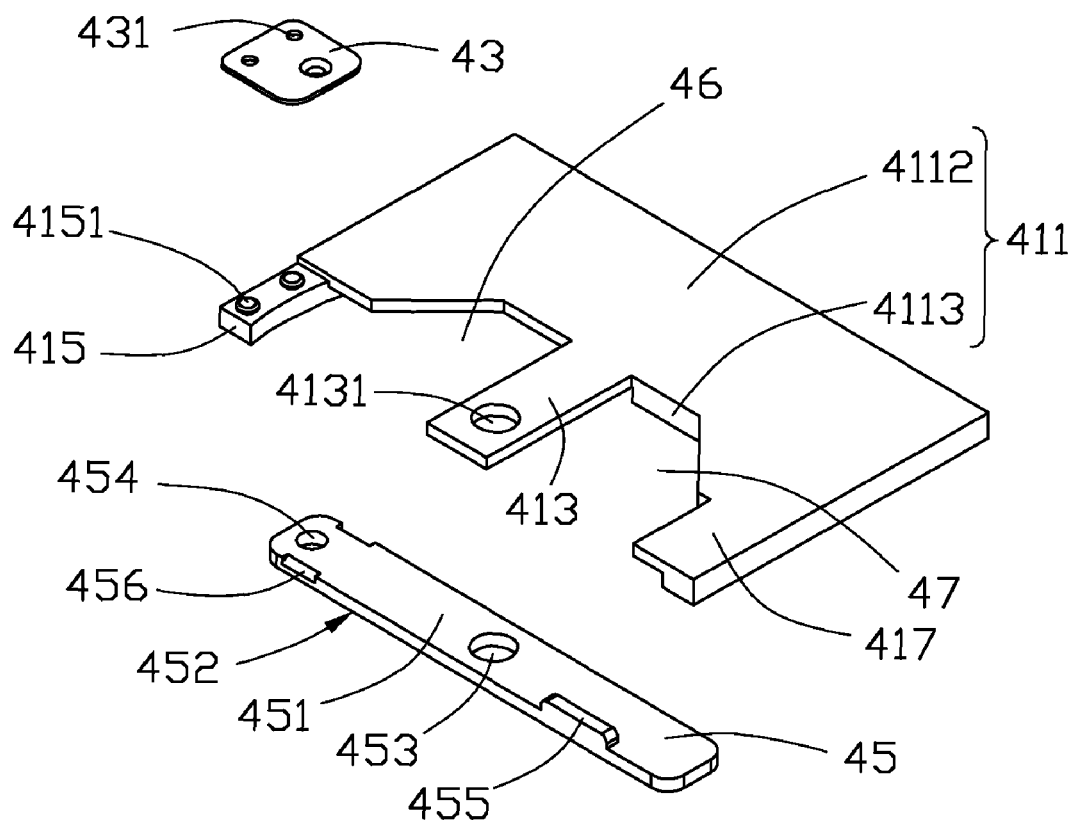
FIG. 3 is an enlarged, exploded, isometric view of the SIM card retention assembly of the electronic device of FIG. 2.
Figure 4:
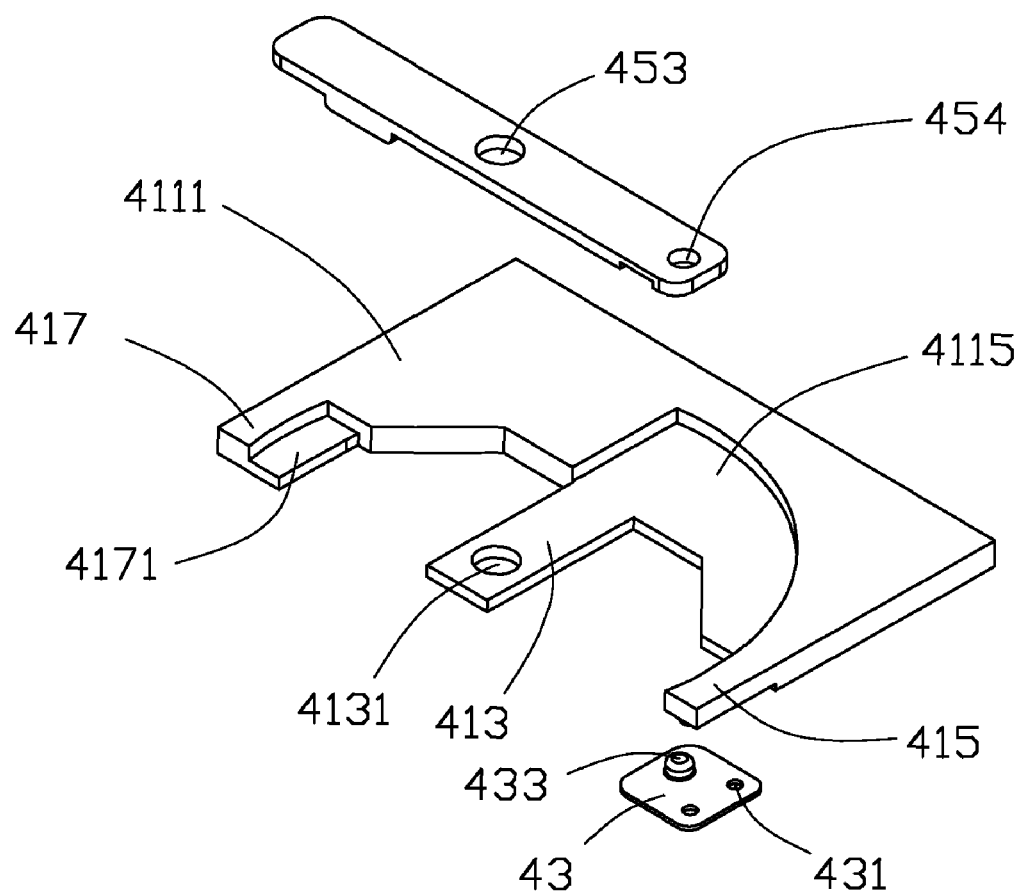
FIG. 4 is similar to FIG. 3, but viewed from another aspect.
Figure 5:
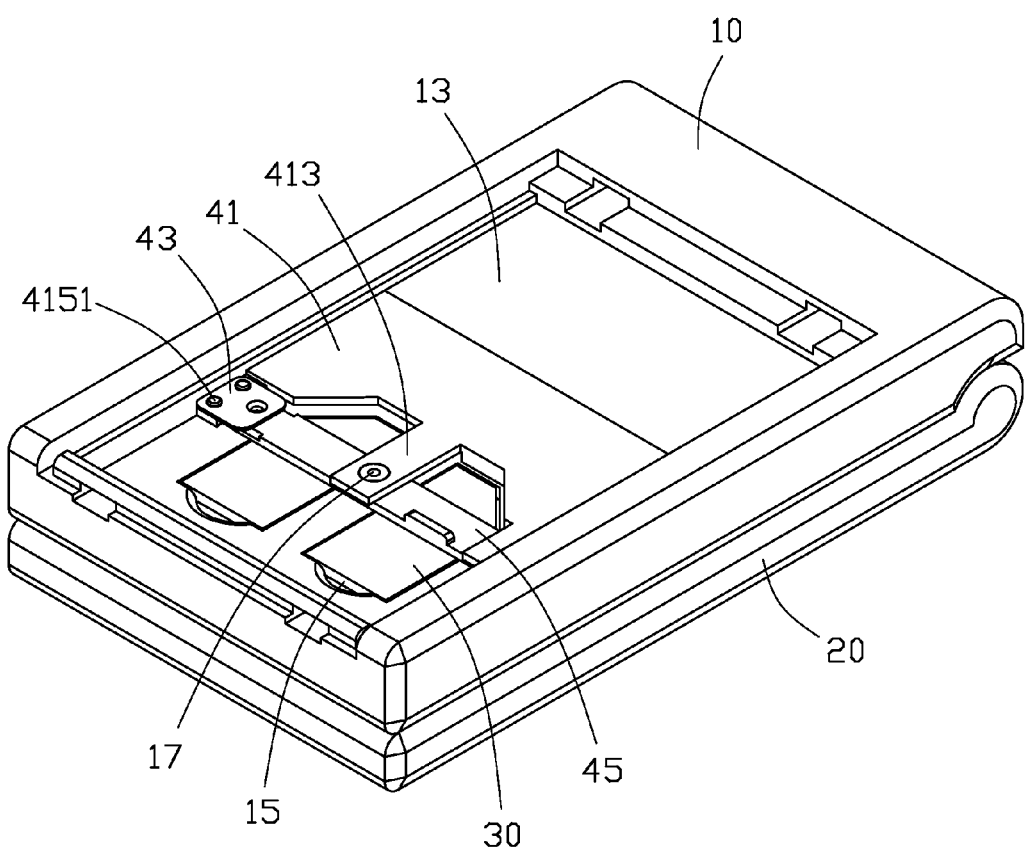
FIG. 5 is similar to FIG. 1, but without the cover and the battery.

Referring also to FIGS. 3 and 4, the retention assembly 40 includes a retaining member 41, a positioning member 43, and a rotary member 45. The retaining member 41 is fixed on the first main body 10 adjacent to the two SIM card seats 15. The rotary member 45 is rotatably connected to the protruding column 17 of the first main body 10 between the retaining member 41 and the two SIM card seats 15. The rotary member 45 can be rotated in a substantially horizontal plane relative to the first main body 10. The positioning member 43 is fixed to the retaining member 41 for positioning the rotary member 45 to secure the SIM cards 30 in the SIM card seats 15.

The retaining member 41 includes a sheet-like main body 411. The main body 411 includes a mounting surface 4111 facing the bottom surface of the battery groove 13, a top surface 4112 opposite to the mounting surface 4111, and a side surface 4113 connecting the mounting surface 4111 and the top surface 4112. The main body 411 further includes a first protruding portion 413, a second protruding portion 415 and a third protruding portion 417 each extending from the side surface 4113. The first protruding portion 413 extends from a middle portion of the side surface 4113. The second protruding portion 415 extends from an end of the side surface 4113. The third protruding portion 417 extends from another end of the side surface 4113. Thus, the first, second, and third protruding portions 413, 415, 417 and the side surface of the main body 411 cooperatively define two cutouts 46, 47. The cutouts 46, 47 may have shapes according to shapes of an end of two SIM card seats 15 away from the arcuate depression 151 to allow the SIM cards 30 ingress and egress from the respective SIM card seats 15.

In one embodiment, the retaining member 41 is made of plastic. The retaining member 41 is fixed to the bottom surface of the battery groove 13 by for example, a double-sided adhesive tape (not shown) adjacent to the SIM card seats 15. The main body 411 of the retaining member 41 further defines a receptacle depression 4115 (see FIG. 4) in the mounting surface 4111 between the first and second protruding portions 413, 415. The first protruding portion 413 defines a through hole 4131 configured for the protruding column 17 to pass through. The second protruding portion 415 includes two fastener columns 4151 extending from the top surface 4112. The third protruding portion 417 defines a limiting depression 4171 in the mounting surface 4111 and communicating with the cutout 46.

The positioning member 43 may be a resilient member such as a resilient sheet, a spring, and a rubber member. In one embodiment, the positioning member 43 is a metallic resilient sheet. The positioning member 43 defines two mounting holes 431 corresponding to the two fastener columns 4151. A columnar positioning post 433 facing the mounting surface 4111 extends from the positioning member 43. The positioning member 43 is fixed to the retaining member 41 via the fastener columns 4151 passing through the mounting holes 431, for example, by being welded together. In other alternative embodiments, the fastener columns 4151 and mounting holes 431 may be replaced by other fastener members such as a screw and threaded hole structure, or hooking structures.

The rotary member 45 may be a substantially elongated sheet-like member including a first surface 451 and a second surface 452 opposite to the first surface 451. The rotary member 45 further defines a mounting hole 453 in a middle portion of the rotary member 45 corresponding to the protruding column 17, and a positioning hole 454 at an end of the rotary member 45 corresponding to the positioning post 433. The mounting hole 453 is a through hole communicating with the first and second surface 451, 452. The positioning hole 454 can be one of a through hole or a blind hole. In the illustrated embodiment, the positioning hole 354 is a through hole.

The rotary member 45 is fixed between the first main body 10 and the retaining member 41 by passing the protruding column 17 through the mounting hole 453 and the through hole 4131. The rotary member 45 can be rotated relative to the protruding column 17 of the first main body 10 in a horizontal plane.

An end of the rotary member 45 can be moved and fixed to the positioning member 43 by inserting the positioning post 433 into the positioning hole 454, and the other end of the rotary member 45 is inserted into the limiting depression 4171, such that the rotary member 45 is positioned on a middle portion of the two SIM cards 30 tightly, and the SIM cards 30 are secured in the two SIM card seats 15. The positioning post 433 is detachable from the positioning hole 454, so that the end of the rotary member 45 may be pushed into the receptacle depression 4115, thereby exposing the SIM cards 30. Thus, it is very convenient to disassemble the SIM cards 30 from the SIM card seats 15. In addition, the SIM cards 30 and the SIM card retention assembly 40 are not easily damaged.

In the illustrated embodiment, the rotary member 45 may further include a pushing protrusion 455 extending from an edge of the first surface 451 away from the positioning hole 454, and two sliding slots 456 defined in the two opposite edges of the first surface 451 adjacent to the positioning hole 454. The sliding slots 456 are configured to facilitate the positioning post 433 to engage with the positioning hole 454 of the rotary member 45.

It should be pointed out that the first main body 10 may only define a single SIM card seat 15 for receiving one SIM card, and a length of the rotary member 45 of the retention assembly 40 can be changed according to the width of the single SIM card seat 15.

Finally, while the embodiments have been described and illustrated, the disclosure is not to be construed as being limited thereto. Various modifications can be made to the embodiments by those of ordinary skilled in the art without departing from the true spirit and scope of the disclosure as defined by the appended claims.

What is claimed is:

1. An electronic device comprising:
a battery;
a first main body defining a battery groove therein for receiving the battery, a first subscriber identification module (SIM) card seat and a second SIM card seat in a bottom surface of the battery groove, the second SIM card seat aligned apart from the first SIM card seat, wherein the first main body further comprises a protruding column protruding from a portion of the bottom surface of the battery groove between the first and second SIM card seats;
a first SIM card disposed in the first SIM card seat; and
a SIM card retention assembly comprising a retaining member fixed to the first main body and adjacent to the first SIM card seat, a positioning member fixed to the retaining member, and a rotary member rotatably connected to the first main body between the retaining member and the first SIM card seat, wherein the retaining member comprises a sheet-like main body comprising a mounting surface facing the bottom surface of the battery groove, a top surface opposite to the mounting surface, and a side surface connecting the mounting surface and the top surface; and the rotary member can be rotated relative to the first main body in a substantially horizontal plane; the positioning member holds the rotary member to fix the first SIM card in the first SIM card seat tightly.

2. The electronic device of claim 1, wherein the sheet-like main body of the retaining member further comprises a first protruding portion extending from a middle portion of the side surface, a second protruding portion extending from an end of the side surface and a third protruding portion extending from another end of the side surface; the first, second, and third protruding portions and the side surface cooperatively define two cutouts according to shapes of ends of two SIM card seats.

3. The electronic device of claim 2, wherein the first protruding portion defines a through hole for the protruding column of the first main body to pass through, and the third protruding portion defines a limiting depression in the mounting surface and communicating with the cutout, the limiting depression for receiving an end of the rotary member.

4. The electronic device of claim 3, wherein the positioning member is a resilient member selected from the group consisting of a resilient sheet, a spring, and a rubber member; the positioning member is fixed on a top surface of the second protruding portion.

5. The electronic device of claim 4, wherein the second protruding portion comprises two fastener columns separately extending from the top surface; the positioning member is a metallic resilient sheet defining two mounting holes corresponding to the two fastener columns; the positioning member further comprises a positioning post facing the mounting surface; the positioning member is fixed to the retaining member via the fastener columns passing through the mounting holes and welded together.

6. The electronic device of claim 4, wherein the rotary member is an elongated sheet-like member including a first surface and a second surface opposite to the first surface; the rotary member further defines a mounting hole in a middle portion of the rotary member according to the protruding column, and a positioning hole defined in an end of the rotary member according to the positioning post; the rotary member is fixed between the first main body and the retaining member by the protruding column passing through the mounting hole and the through hole; an end of the rotary member is capable of being moved and fixed to the positioning member by inserting the positioning post into the positioning hole; the other end of the rotary member is blocked into the limiting depression.

7. The electronic device of claim 6, wherein the mounting hole is a through hole communicating with the first and second surface.

8. The electronic device of claim 6, wherein the positioning hole is one of a through hole or a blind hole.

9. The electronic device of claim 6, wherein the rotary member further comprises a pushing protrusion extending from an edge of the first surface away from the positioning hole.

10. The electronic device of claim 6, wherein the rotary member further comprises two sliding slots defined in two opposite edges of the first surface adjacent to the positioning hole, to help the positioning post engage with the positioning hole of the rotary member.

11. An electronic device comprising:
- a first main body defining a first subscriber identification module (SIM) card seat and a second SIM card seat aligned apart from the first SIM card seat, wherein the first main body further comprises a protruding column protruding from a portion of the bottom surface of the battery groove between the first and second SIM card seats;
- a first SIM card disposed in the first SIM card seat;
- a second SIM card disposed in the second SIM card seat; and
- a SIM card retention assembly comprising a retaining member fixed to the first main body and adjacent to the first SIM card seat, and a rotary member, the rotary member further defines a mounting hole in a middle portion thereof according to the protruding column, the rotary member fixed between the first main body and the retaining member by the protruding column passing through the mounting hole, wherein the rotary member can be rotated relative to the protruding column in a substantially horizontal plane, such that the rotary member can be controlled to fix the first SIM card in the first SIM card seat and fix the second SIM card in the second SIM card seat tightly, or release the first SIM card and the second SIM card at the same time.

12. The electronic device of claim 11, wherein the retaining member comprises a sheet-like main body, a mounting surface facing the bottom surface of the battery groove, a top surface opposite to the mounting surface, and a side surface connecting the mounting surface and the top surface.

13. The electronic device of claim 12, wherein the sheet-like main body of the retaining member further comprises a first protruding portion extending from a middle portion of the side surface, a second protruding portion extending from an end of the side surface and a third protruding portion extending from another end of the side surface; the first, second, and third protruding portions and the side surface cooperatively define two cutouts according to shapes of ends of the first and second SIM card seats.

14. The electronic device of claim 13, wherein the first protruding portion defines a through hole for the protruding column of the first main body to pass through, and the third protruding portion defines a limiting depression in the mounting surface and communicating with the cutout, the limiting depression for receiving an end of the rotary member.

* * * * *